United States Patent [19]

Oprandis et al.

[11] 4,338,629
[45] Jul. 6, 1982

[54] PROCESS AND APPARATUS FOR CODING BINARY SIGNALS FOR NUMBERING IMAGES OR PICTURES STORED ON A RECORDING MEDIUM FOR STOP MODE REPRODUCTION

[75] Inventors: Pierre Oprandis; René Romeas, both of Paris, France

[73] Assignee: Thomson-CSF, Paris, France

[21] Appl. No.: 147,958

[22] Filed: May 8, 1980

[30] Foreign Application Priority Data

May 10, 1979 [FR] France .................................. 79 11853

[51] Int. Cl.³ .............................................. H04N 5/76
[52] U.S. Cl. .................................... 358/128.5; 369/50; 369/59; 360/10; 360/72.2; 360/49; 371/36; 371/70
[58] Field of Search ................ 360/9, 10, 34, 38, 72.2, 360/49, 47; 179/100.1 G, 100.3 V; 358/128.5, 128.6, 147; 371/36, 65, 69, 70; 369/30, 50, 59

[56] References Cited

U.S. PATENT DOCUMENTS

| 3,320,598 | 5/1967 | Star | 371/36 |
| 3,780,276 | 12/1973 | Carter | 371/36 |
| 3,863,215 | 1/1975 | McGrogan | 371/36 |
| 4,000,510 | 12/1976 | Cheney | 360/33 |
| 4,132,975 | 1/1979 | Koike | 371/69 |

FOREIGN PATENT DOCUMENTS

| 2360221 | 2/1978 | France | 360/72.2 |
| 2361029 | 3/1978 | France | 360/72.2 |
| 2376486 | 7/1978 | France | 360/10 |
| 2384405 | 10/1978 | France | 360/10 |

Primary Examiner—Alan Faber
Attorney, Agent, or Firm—Oblon, Fisher, Spivak, McClelland & Maier

[57] ABSTRACT

Process for coding binary image numbering signals to be stored on a recording medium and device for reading these signals. The process aims at protecting these signals from variations encountered during the transcription process onto a recording medium. This protection is obtained by selective inversion and repetition of predetermined parts of the binary signals.

Application more specifically to an audio visual signal transmission apparatus incorporating a track jump pulse generating system, the images and the binary numbering signals of these images being recorded on a video disk.

10 Claims, 7 Drawing Figures

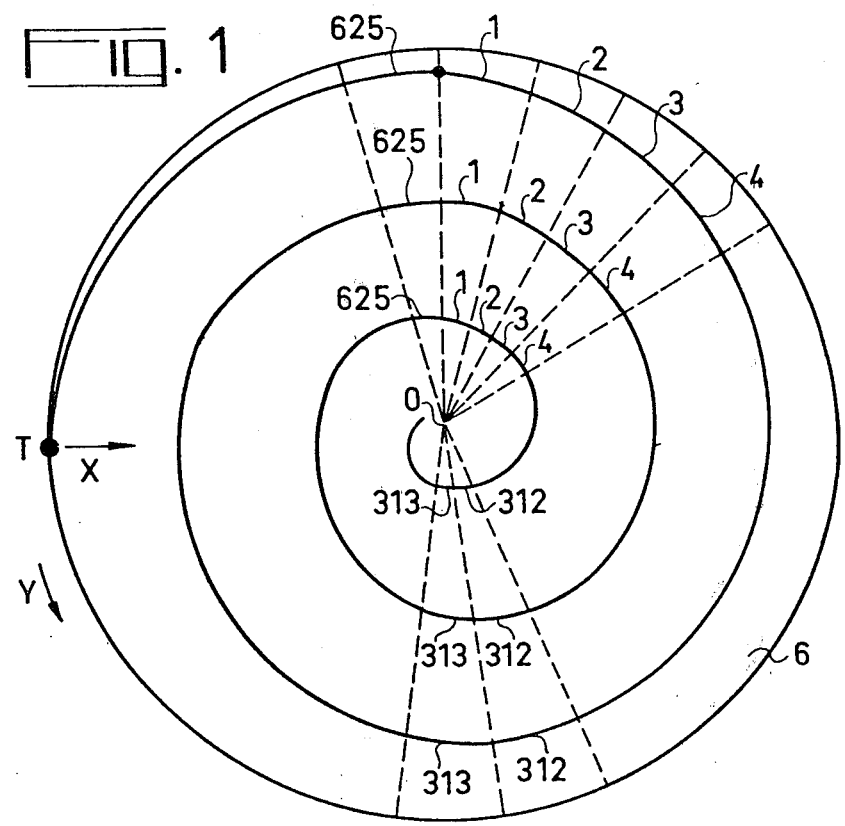

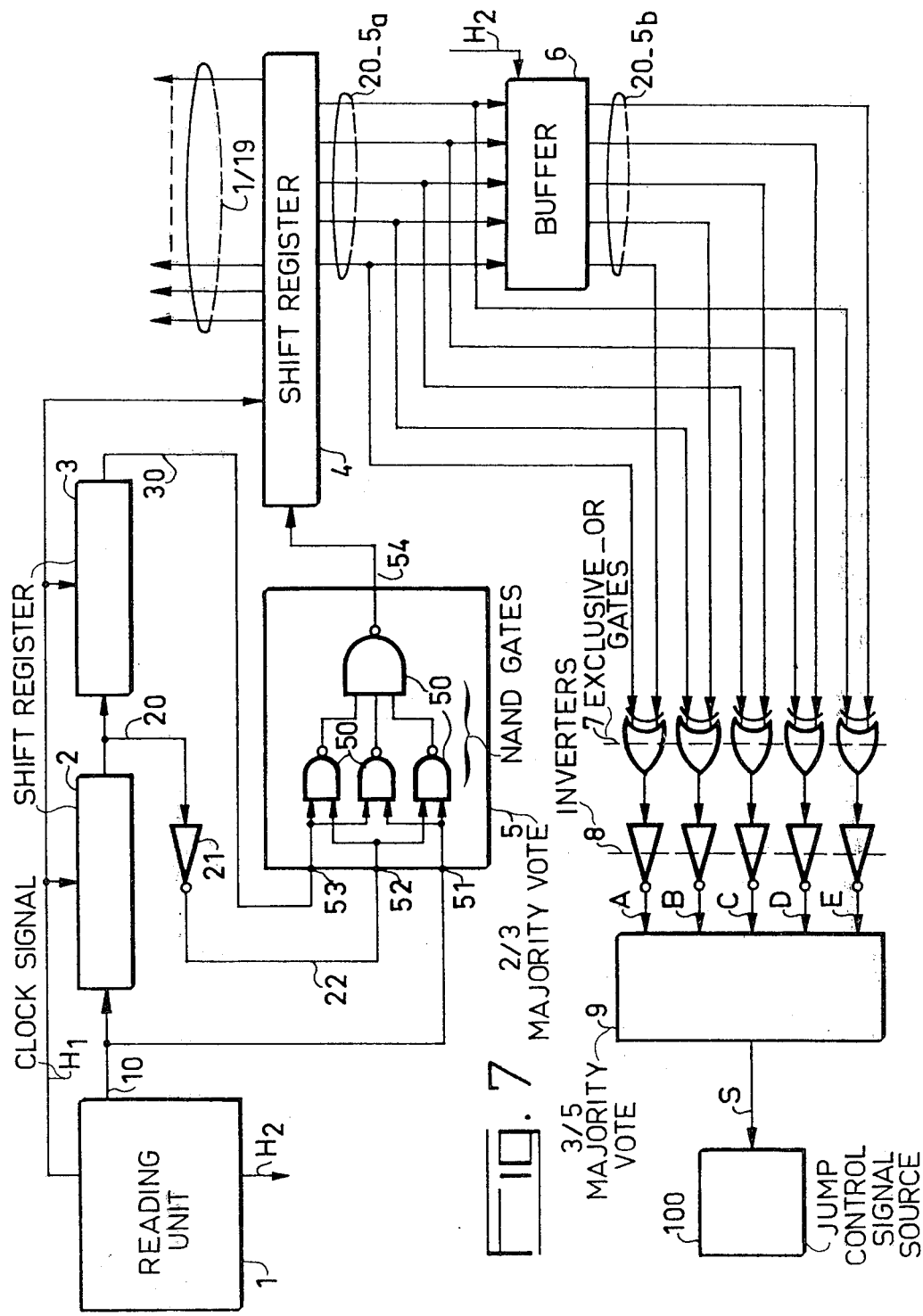

PROCESS AND APPARATUS FOR CODING BINARY SIGNALS FOR NUMBERING IMAGES OR PICTURES STORED ON A RECORDING MEDIUM FOR STOP MODE REPRODUCTION

BACKGROUND OF THE INVENTION

The present invention relates to a process for coding binary signals for numbering images or pictures stored on a recording medium, particularly a video disk and to the device for reading the thus coded signals.

It is known to record on a medium television signals which conventionally comprise a video component and a sound component. The recorded television signals are obtained from the analysis of images in one or more fields, each image being for example an uneven number of lines distributed over two fields, 625 lines in Europe. European television systems operate with a frequency of 50 fields per second. Analysis of the images takes place in accordance with two interlaced fields, which gives 25 images per second. Other systems which are used, particularly in the USA, such as NTSC operate with a frequency of 60 fields per second.

Operational signals such as synchronizing signals are also recorded during the line and image return intervals. The field return intervals can also incorporate binary image numbering signals. During the reading process, this information is used on the one hand for finding a predetermined image and on the other to obtain certain special effects, such as accelerated or decelerated image stopping.

On a video disk, the images are recorded on a spiral track or in concentric circles. In the case of a frequency of 50 fields per second, a complete image is recorded on each turn of the track, i.e. one complete image or two fields can be read for each revolution of the video disk. Stopping on the image can take place merely by jumping from one track to the previous track after one revolution of the video disk. However, this is not possible for a frequency of 60 fields per second, because each image must have 3 fields, corresponding to one and a half revolutions of the video disk.

French Patent Application No. 77 000 79, filed on Jan. 4, 1977 and published under No. 2,376,486 proposes a device making it possible to bring about a correct stopping on the image, no matter what process is used for recording these images on the disk, i.e. SECAM or PAL, 50 Hz, 625 lines or NTSC, 60 Hz, 525 lines. A binary-coded number is associated with each field and the numbers associated with the fields of one and the same image are identical. Thus, only the smallest weight bit varies from one image to the next. The jump pulse generating system described in the aforementioned patent application uses this variation to establish whether the field which is read does or does not come from the same images as the previously read field. Thus, for this device to operate correctly, it is necessary to ensure that no reading error or any type of deterioration makes it impossible to restore the image number asigned to one of the fields and even possibly to 2 or 3 fields constituting the image on which a stop is to be made. It is merely necessary for the error to affect the lowest weight bit of the image number to prejudice the operation of the device.

BRIEF SUMMARY OF THE INVENTION

In order to obviate these disadvantages, the present invention relates to a process for coding binary image numbering signals to be stored on a recording medium, said binary signals being in the form of a serial bit train, wherein the binary signals are protected against variations encountered during the transcription process by repeating a number of times the lowest weight bit of said serial bit train and retransmitting the redundant serial bit train obtained in this way on a number of occasions, the bits of one part of said redundant trains also being inverted.

The invention also relates to a reading device for the binary image numbering signals coded according to the present process and its application to an audio visual signal transmission apparatus incorporating a track jump control pulse generator.

BRIEF DESCRIPTION OF THE DRAWINGS

The invention is described in greater detail hereinafter relative to non-limitative embodiments of the invention and the attached drawings, wherein show:

FIG. 1 an arrangement of television signals recorded on a disk.

FIG. 2 the coding of the image number recorded according to two different standards.

FIG. 7 an image number reading device according to the invention.

DETAILED DESCRIPTION OF THE PREFERRED EMBODIMENTS

Figure 3:
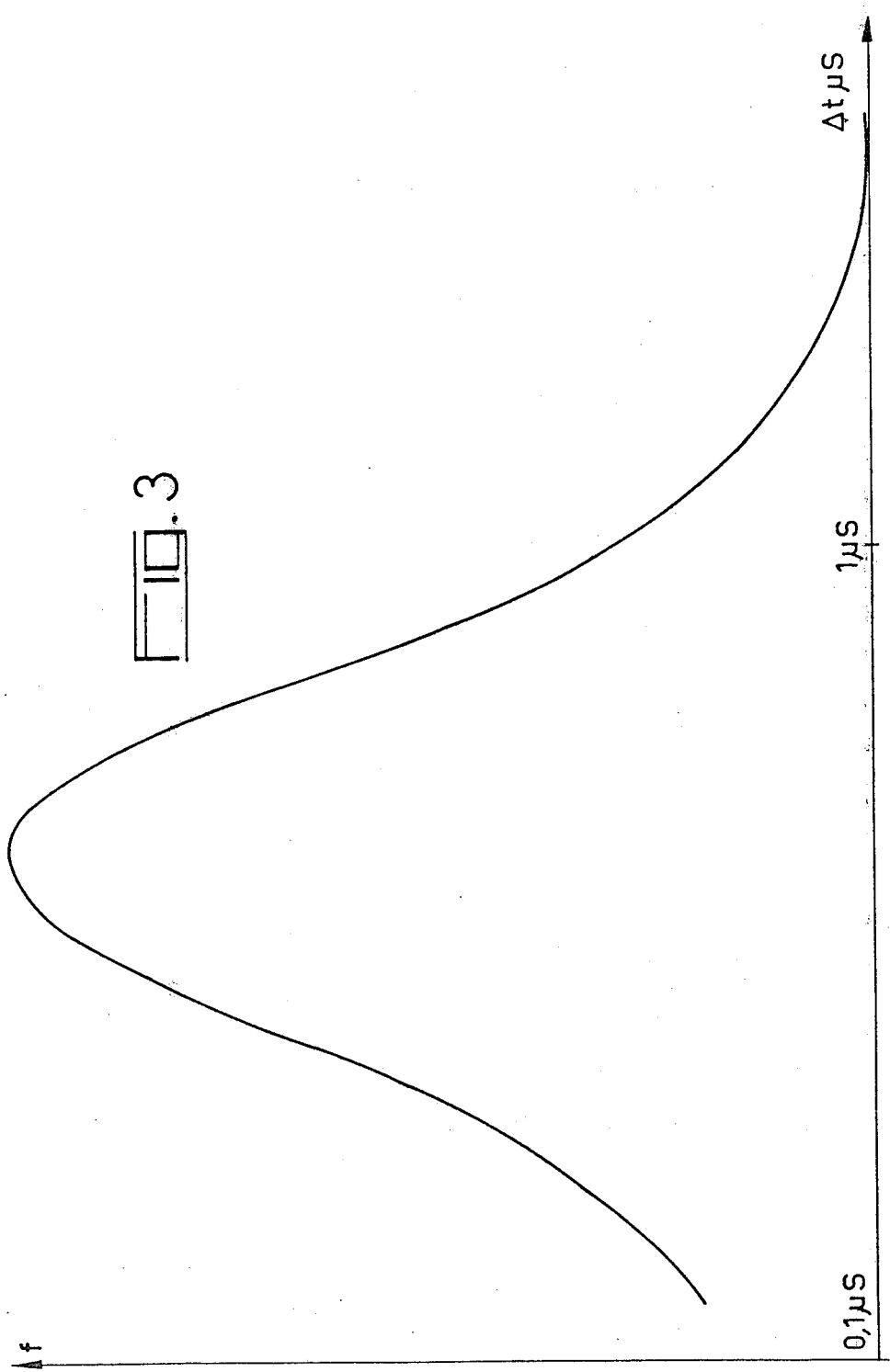
FIG. 3 a curve illustrating the frequency with which faults appear as a function of their duration.

Hereinafter, for illustrative purposes, only the special case of a video disk reader with an optical reading head is described, without however limiting the scope of the invention thereto.

FIG. 1 diagrammatically illustrates an arrangement of television signals recorded on one of the faces of a recording medium 6 in the form of a disk, recording taking place on a spiral track. The face of the disk is subdivided into 625 equal angular sectors by dotted lines emanating from the center O. A scanning line of a television picture is recorded on each of the inscription zones obtained by subdividing the turns by angular sectors. In the present embodiment, the number of lines of the standard is 625. The number associated with each zone is the rank of the corresponding scanning line.

In order to read the recording, disk 6 must be rotated about the center O in the direction of arrow Y by a constant speed drive mechanism, whilst projecting a reading light spot T onto the track. This spot is supplied by a reading system radially displaced in direction X. The components of the drive mechanism and the reading system do not form part of the present invention and are not shown.

A television picture or image is entirely represented by two fields, each of 312.5 lines. Thus, a complete picture is read for each revolution of disk 6. The lines of the same rank corresponding to successive pictures are inscribed on the inscription zones located in a same angular sector. In the drawing, the ranks are represented by numbers 1, 2, 3, 4–625.

In countries where the electrical frequency is 50 Hz, television standards have been adopted, e.g. the SECAM and PAL standards which operate at 50 fields per second. In countries where the frequency is 60 Hz, the television standards operate at a frequency of 60 fields per second. This is the case in the USA which has adopted the NTSC standard.

A major source of pictures is the cinema, where the film speed is 24 frames per second. In the case of European standards, there is no problem when these are used for television purposes, it being merely necessary to very slightly increase the film speed from 24 to 25 frames per second. However, this is not the case with 60 fields per second. In this case, it is necessary to record in alternating manner two fields for one picture and then 3 fields for the following picture, the third field being the repeat of the first and so on. Thus, on average, there are 2.5 fields per picture and the average speed obtained is 24 frames per second.

A binary signal recording representing its number is associated with each picture. The fields belonging to one and the same picture can be the same number. The number allocated to each picture in coded form can be recorded in certain available lines (e.g. in a 625 line standard, lines 16 and 329), in addition to operational and synchronizing signals.

FIG. 2(a) illustrates the numbering of the fields and successive images in the case of a 50 per second standard. Pure binary coding or any other coding system can be used, for example a binary coded decimal code. The binary words of FIG. 2(a) only contain 3 significant digits for reasons of clarity. In a specific embodiment, the numbers must have more significant digits, for example 5 digits making it possible to write numbers from 0 to 99 999.

FIG. 2(b) illustrates the case of a 60 field per second standard. There is a succession of two fields, three fields, two fields, etc for one image or picture.

The image number is written during a line corresponding to the return of the vertical scanning, i.e. invisible on the screen, of each of the fields forming the recorded television images by means of a specific signal representing in coded form the number allocated to the image, whose video information follows.

The number is coded in a series of pulses of level 1 or 0, in accordance with the binary coded decimal code. As each digit is represented by 4 pulses or bits 1 or 0, it is necessary to transmit four bits five times, i.e. a minimum of 20 bits for each image numbering.

When it is desired to view a given image among all those recorded on a video disk, the operation takes place in two stages. In a first stage, the image has to be discovered and in a second stage, the reading apparatus must stop on this image. The information contained in the image number is used for these two operations.

The invention proposes two arrangements making it possible to protect effectively the integrity of the information necessary for the satisfactory performance of these two operations. This is on the one hand the overall protection of the image number making it possible to correctly seek a predetermined image and on the other hand the specific protection of the lowest weight bit, which is the only one used during stopping on the image.

FIG. 3 is a curve giving the frequency of the variations (on ordinate f) as a function of their duration (abscissa $\Delta t$) for a signal recorded and then read from a video disk-type recording medium. Most of the variations due to signal losses last on average less than 1 microsecond. Bearing in mind the binary flow rate used on the video disk (4.5 M bit per second) it is relatively easy for an error to affect more than two consecutive bits. Under these conditions and by consecutively repeating three times the serial bit train representing the image number it becomes relatively improbable that a signal loss would affect the same bits of two consecutive trains. Statistical studies indicate that for an average quality disk, there are 10 to 20 signal losses per complete television picture. The average time separating two signal losses consecutively significantly exceeds the duration separating two or even three consecutive bit trains.

Another special characteristic of signal losses on the video disk, which is linked with the type of modulation and recording used, is that the majority of errors are equivalent on brief loss of the high frequency reading signal and are therefore interpreted by the demodulator as a very low frequency of said signal. Thus, at the output of the demodulator, there is a video signal passing towards the infrablack.

These infrablacks are interpreted as 0 by the decoder. Thus, this type of error can only affect bits at level 1. In view of this, it is of interest to transmit the second serial bit train, representing the image number, inverted relative to the preceding and following bit trains. Thus, the bits having a logic level 1 in the first bit train would have a logic level 0 in the second bit train and then 1 in the third bit train and so on. It follows that in the case where two signal losses of the type described hereinbefore affected the same bits of two consecutive bit trains, at least one of these trains would not be affected. This constitutes a first aspect of the invention.

Figure 5:
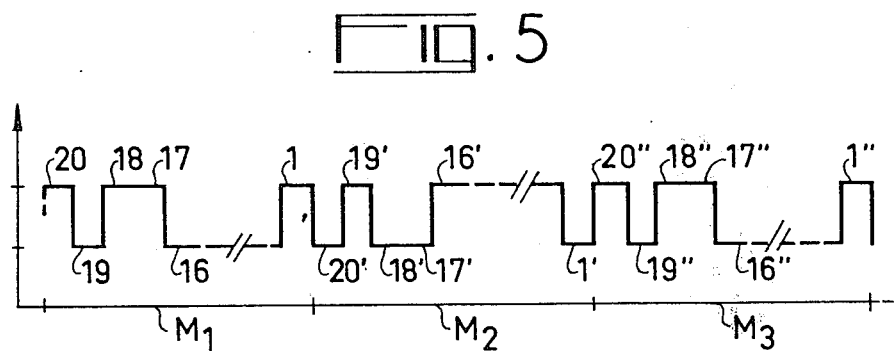
FIGS. 5 and 6 diagrams illustrating two aspects of the invention.

FIG. 5 illustrates this aspect. Each binary word representing an image number comprises 20 bits numbered from 1 to 20. These words are repeated three times, namely $M_1$, $M_2$ and $M_3$. Bits 1 to 20 of word $M_1$ and 1' to 20' of word $M_2$ are recorded in accordance with their "true" value. Bits 1' to 20' of word $M_2$ are inverted. By convention, bit 1 is the highest weight bit and bit 20 is the lowest weight bit. The term "true" is used as the opposite to term "inverted".

This protection is effective in roughly 99% of cases, which is very adequate with regard to the picture number in its entirety, the latter being repeated at least twice per picture (2 or 3 fields per picture according to the standard used). Thus, for one picture there is at least one field which has a correct number.

However, in the case of a disk with 45,000 pictures, there will be a few pictures or even a few dozen pictures (e.g. if the disk is damaged or very dusty), whose numbers are not identical for the two or three fields constituting this image. Taking account of the probability that the error will affect the lowest weight bit of the erroneous number (1/20th) there remain a few images per disk on which it is impossible to stop by using the device described in the aforementioned French Patent Application. This is not a disadvantage in the case of a moving sequence in which each image differs only very slightly from the preceding or following image. However, in the case of an image library, in which all the images are different, it is then impossible to view certain of them. This can be compared with a book, certain of whose pages have been destroyed.

Figure 6:
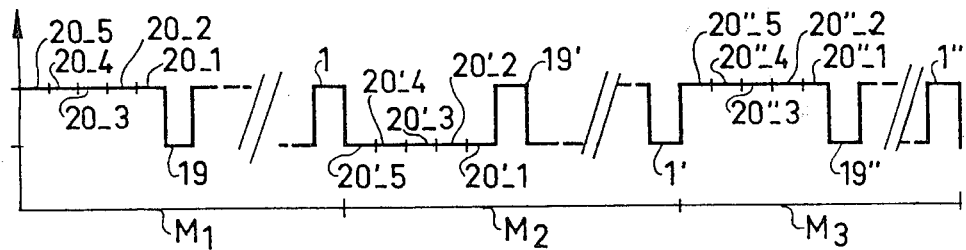

According to a second aspect of the invention the lowest weight bit is repeated four times (in addition to the normal bit) in each of the bit trains making up an image number. Thus, three trains of 24 bits for each number are therefore recorded instead of 3 trains of 20 bits. FIG. 6 illustrates the combination of the two aspects of the invention. The bits 20-2 to 20-5 represent the repetition of the normal bit 20-1. The repeated bits of the word $M_2$ undergo the same transformation as the normal bits, said bits thus being inverted.

Figure 4:
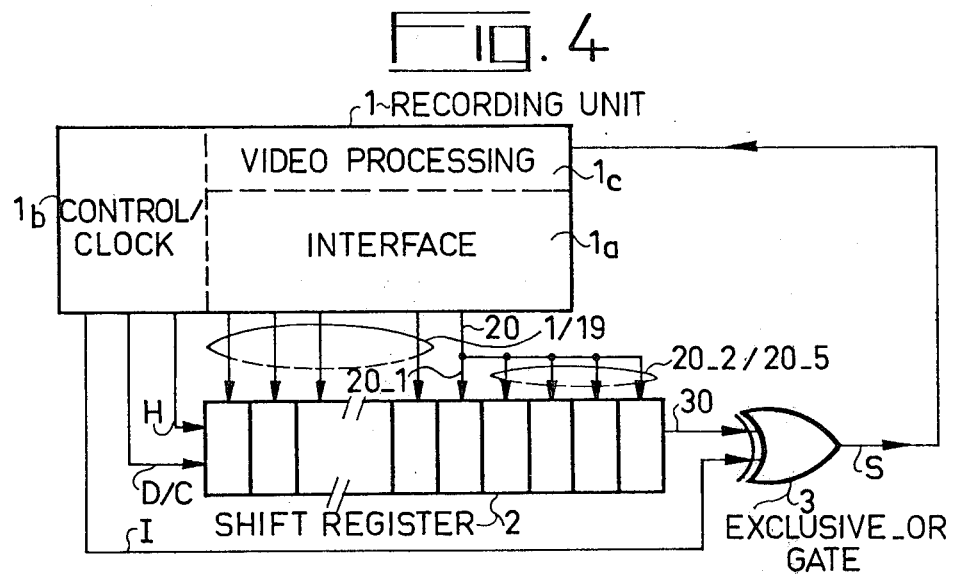
FIG. 4 an image number coder according to the process of the invention.

FIG. 4 describes a device making it possible to utilize the coding process according to the invention. Reference numeral 1 designates the conventional circuits of a video disk recorder. This recorder comprises synchronizing and clock circuits 1b and interface circuits 1a between the image number coding device according to the invention and the general recording circuits 1c of the recorder. These circuits are common to prior art recorders and are well known to the Expert, so that they are not specifically described. During the recording of a television picture, the bits representing the number of said picture are present on outputs 1 to 20 of interface circuit 1a. These bits are transmitted to inputs 1 to 19 and 20-1 of a parallel-serial converter 2. In addition, bit 20 is repeated four times to be transmitted to four supplementary inputs 20-2 to 20-5 of converter 2. The repetition of this bit can be effected simply by a "OR" cable as indicated in FIG. 4. The parallel-serial converter can comprise a shift register with 24 parallel inputs and one serial output 30. This register also receives displacement clock signals H and a control signal D/C permitting the initial loading of bits 1 to 19 and 20-1 to 20-5 before displacement. The serial output 30 is transmitted to one of the inputs of an "EXCLUSIVE-OR" gate 3. The second input of this logic "EXCLUSIVE-OR" gate 3 receives a binary control signal I. When this control signal I is low, i.e. represents a logic 0, the bits appearing at the output 30 of shift register 2 are transmitted unchanged to the output S of the "EXCLUSIVE-OR" gate 3. However, when the signal I is logic 1, the bits are inverted. Bits 1 to 20-5 are loaded three times into the register 2 and are transmitted in series to output S, alternately in "true" value (FIG. 6: $M_1$ and $M_3$) and in inverted form ($M_3$). These bits are then transmitted to circuit 1c to be recorded in any appropriate form on a video disk.

FIG. 7 illustrates a reading device for the binary image numbering signals according to the invention. Reference numeral 1 represents the conventional circuitry of a video disk reader, as well as the associated clock and synchronizing circuits, supplying in particular signals $H_1$ and $H_2$. The bit trains repeated according to the process of the invention appear in series on link 10 after reading. These bits are applied to the input of a shift register 2 and to the input 51 of a comparator 5. The bits from register 2 are in turn applied to a shift register 3 and via link 20, inverter 21 and link 22 to the input 52 of comparator 5. The bits from shift register 3 are applied via link 30 to input 53 of comparator 5. Clock pulses $H_1$ from the decoding circuits of reader 1, synchronous with the read bits, are applied to the shift control inputs of registers 2 and 3. These two registers have in each case 24 stages. The simultaneously of the three binary words $M_1$, $M_2$ and $M_3$ is brought about by means of registers 2 and 3. The corresponding bits of these three binary trains representing the repetition of bits 1 and 1' (after inversion) and 1" are thus simultaneously transmitted to the three inputs 51 to 53 of comparison circuit 5. Comparison circuit 5 has four interconnected logic NAND gates, as indicated in FIG. 7, so as to bring about a ⅔ majority vote. The bits resulting from this vote are transmitted via link 54 to a shift register 4, with a serial input and parallel outputs. This register 4 also receives the clock pulses $H_1$ and necessary for the displacement. It has 24 stages and comprises outputs 1 to 19, as well as five outputs, carrying the overall references 20-5a representing the repeated lowest weight bits. The latter outputs are transmitted to a buffer memory 6 having five parallel inputs and five parallel outputs 20-5b. This memory receives a loading authorization signal $H_2$, present when the majority vote carried out by circuit 5 has been completed and the bits resulting from this vote have been loaded into shift register 4, i.e. after the 72nd pulse of clock $H_1$. The recurrence frequency of signal $H_2$ is equal to the field frequency. For the following field, the same process is repeated during the reading of the image number associated with this field. The five repeated bits of the lowest weight bit are then compared with the five bits present at the output of memory 6, said comparison being carried out by the given five logic "EXCLUSIVE-OR" gate 7. The five bits resulting from this comparison are inverted by inverters 8 and are transmitted to inputs A to E of a comparison circuit 9. This circuit carries out a 3/5 majority vote. Output S of this circuit thus represents the function:

$$S = A.B.C + A.B.D + A.B.E + A.C.D + A.C.E + A.D.E + B.C.D + B.C.E + B.D.E + C.D.E$$

Output S is at logic level 1, if at least three of the inputs A to E are at level 1. Level 1 at present at output S, indicates that the two fields which have just been read belong to the same image and a track jump is authorized. Output S is transmitted to the control input of a track jump pulse generating system 100. Bits 1 to 19 and one of the lowest weight bits 20 are used during the phase of seeking an image carrying a given number.

The coding process according to the invention makes it possible to give a very good protection to the binary image numbering signals, whilst using little additional equipment. The equipment involved is generally inexpensive and mainly consists of a few integrated circuits, which can be chosen from those already commercially available. As non-limitative examples, the integrated circuits of the types indicated hereinafter can be used for the circuitry of FIGS. 4 and 7:

| | |
|---|---|
| Shift register with parallel inputs and serial output (FIG. 4:2) | 3 SN 64 165N circuits |
| "EXCLUSIVE-OR" gates (FIG. 4:3 and FIG. 7:7) | SN 74 86N circuits |
| Inverters (FIG. 7:8 and 21) | SN 74 04N circuits |
| NAND gates (FIG. 7:50) | SN 7400–7410 circuits |
| Shift register with a serial input and a serial or parallel output (FIG. 7:2, 3 and 4) | 3 SN 74 164N circuits (for each register) |
| Buffer memory (FIG. 7:6) | SN 74 378N circuit |
| Comparison circuit (FIG. 7:9) | MC 4 530 circuit |

The invention is not limited to the embodiments described hereinbefore, which have only been provided for illustrative purposes. Although more specifically intended for video disk systems, the coding process according to the invention can be used for any other recording medium. The reading/writing means can be either optical or magnetic.

What is claimed is:

1. A process for coding binary image numbering signals to be stored on a recording medium, said binary signals being in the form of a serial bit train, wherein the binary signals are protected against variations encountered during the transcription process by repeating a number of times the lowest weight bit of said serial bit train and retransmitting the redundant serial bit train obtained in this way on a number of occasions, the bits of one part of said redundant trains also being inverted.

2. A process according to claim 1, wherein the redundant serial bit trains are transmitted three times, the bits of the first and third trains remaining unchanged and the bits of the second train being inverted.

3. A process according to claim 1, wherein the lowest weight bit of each of the said serial bit trains is repeated five times.

4. A decoding device for decoding binary image numbering signals stored on a recording medium in the form of a serial bit train, wherein the binary signals are protected against variations encountered during a transcription process by repeating a number of times the lowest weight bit of said serial bit train and retransmitting the redundant serial bit train obtained in this way on a number of occasions, the bits of one part of said redundant trains also being inverted, comprising, members for reading the signals stored on the recording medium and clock and synchronizing signals generating means; first memory store means for recording the successively read redundant serial bit trains, means for inverting a predetermined part of the signals recorded in said first memory store means, first comparison means effecting a first majority vote between the signals present at the output of said memory store means, at the output of said inverting means and at the output of said reading members, combined memory store and serial-parallel conversion means for the complete recording of one of said redundant bit trains resulting from the majority vote, and means for evaluating the repeated value of the lowest weight bit stored in said combined memory store and serial-parallel conversion means to determine if successive redundant bit trains belong to the same image or picture.

5. A device according to claim 4, wherein said evaluating means comprises second memory store means for the temporary recording of the repeated value of the lowest weight bit of the bit train recorded in said combined memory store and serial-parallel conversion means, second comparison means comprising two series of inputs, the first of said input series being connected to the outputs of the second memory store means and the second of said input series is connected to the outputs of said combined memory store and serial-parallel conversion means repeating the lowest weight bit and third comparison means receiving the signals present at the outputs of the second comparison means for effecting a second majority vote.

6. A device according to claim 5, wherein the second memory store means are constituted by a static memory with parallel outputs and inputs of capacity 5 bits, said second comparison means being constituted by logic exclusive OR gates with two inputs and said third comparison means are constituted by a 3/5 majority vote circuit with 5 inputs.

7. An apparatus for transmitting audio visual signals written on a recording support in accordance with a track forming a spiral whose turn incorporate in each case two fields belonging to the same picture or to contiguous pictures having a binary image numbering signal reading device according to claim 5, as well as a track jump control pulse generating system, wherein the signal present at the output of the third comparison means of the device is transmitted to the track jump control pulse generating system, authorizing the supply of a track jump control pulse transmitted to the reading members when two contiguous fields belong to the same image or picture.

8. An apparatus according to claim 7, wherein the second memory store means of the binary image numbering signal reading device store the data for the duration of a field.

9. A device according to claim 4, wherein the first memory store means comprise a first shift register of capacity 24 bits which receives at its input the signals read by the reading members and a second shift register connected in cascade of the same capacity and in which the first comparison means are constituted by a logic $\frac{2}{3}$ majority vote circuit with the inputs, the third input being connected to the output of second shift register, the second input, via an inverter to the output of the first shift register and the first input to the input of said register.

10. A device according to claim 4, wherein the combined memory store and serial-parallel conversion means are constituted by a shift register with a serial input and parallel outputs of capacity 24 bits.

* * * * *